US009771834B2

(12) United States Patent
Cheng et al.

(10) Patent No.: US 9,771,834 B2
(45) Date of Patent: Sep. 26, 2017

(54) METHOD AND APPARATUS FOR PROVIDING LOAD DISPATCH AND POLLUTION CONTROL OPTIMIZATION

(75) Inventors: Xu Cheng, Pittsburgh, PA (US); Frederick C. Huff, Pittsburgh, PA (US)

(73) Assignee: EMERSON PROCESS MANAGEMENT POWER & WATER SOLUTIONS, INC., Pittsburgh, PA (US)

(*) Notice: Subject to any disclaimer, the term of this patent is extended or adjusted under 35 U.S.C. 154(b) by 1385 days.

(21) Appl. No.: 10/969,752

(22) Filed: Oct. 20, 2004

(65) Prior Publication Data

US 2006/0085363 A1 Apr. 20, 2006

(51) Int. Cl.
| | |
|---|---|
| *G06Q 30/00* | (2012.01) |
| *F01K 13/02* | (2006.01) |
| *G06Q 10/04* | (2012.01) |
| *G06Q 10/06* | (2012.01) |
| *G06Q 30/02* | (2012.01) |

(52) U.S. Cl.
CPC ........... *F01K 13/02* (2013.01); *G06Q 10/04* (2013.01); *G06Q 10/0637* (2013.01); *G06Q 30/0283* (2013.01); *Y02E 40/76* (2013.01); *Y04S 10/54* (2013.01); *Y04S 10/545* (2013.01); *Y04S 50/14* (2013.01)

(58) Field of Classification Search
CPC .................................................... G06Q 30/00
USPC ............... 705/412, 1, 7.11; 700/287; 60/652
See application file for complete search history.

(56) References Cited

U.S. PATENT DOCUMENTS

| | | | | |
|---|---|---|---|---|
| 4,110,987 | A | * 9/1978 | Cahn et al. | 60/652 |
| 5,432,710 | A | * 7/1995 | Ishimaru et al. | 705/412 |
| 5,517,423 | A | 5/1996 | Pomatto | 700/286 |
| 5,621,654 | A | * 4/1997 | Cohen et al. | 700/287 |

(Continued)

FOREIGN PATENT DOCUMENTS

| | | |
|---|---|---|
| EP | 0 957 184 A2 | 11/1999 |
| GB | 2 415 809 A | 1/2006 |

(Continued)

OTHER PUBLICATIONS

Search Report for GB0513131.3 dated Sep. 15, 2005.

(Continued)

*Primary Examiner* — Akiba Allen
(74) *Attorney, Agent, or Firm* — Marshall, Gerstein & Borun LLP

(57) ABSTRACT

An economic dispatch program allocates a load demand and an emission allowance of a power generation system among various power plants to determine the operational set-points and the pollution control set-points of each of the various power plants in a manner that minimizes the total operating cost for the power generation system, including the pollution control cost. The economic dispatch program uses the pollution control set-points and the load set-points of the various power plants as decision variables and takes into consideration the pollution control costs of the various power plants in allocating the load demand. During operation, the economic dispatch program takes into consideration the pollution credits available to the various power plants in allocating the load demand and pollution control level to determine the optimal operating solution for the power plants.

28 Claims, 9 Drawing Sheets

(56) References Cited

U.S. PATENT DOCUMENTS

| | | | |
|---|---|---|---|
| 6,106,676 A * | 8/2000 | Terry et al. | 204/192.13 |
| 7,474,080 B2 | 1/2009 | Huff et al. | |
| 2004/0162792 A1 | 8/2004 | Satou et al. | |
| 2005/0188745 A1* | 9/2005 | Staphanos et al. | 73/23.31 |
| 2005/0233274 A1* | 10/2005 | Marin et al. | 431/116 |
| 2006/0047607 A1* | 3/2006 | Boyden et al. | 705/400 |
| 2008/0088183 A1* | 4/2008 | Eckroad | H02J 3/16 307/66 |

FOREIGN PATENT DOCUMENTS

| | | |
|---|---|---|
| WO | WO-02/057968 A1 | 7/2002 |
| WO | WO-03/068368 A1 | 8/2003 |

OTHER PUBLICATIONS

Cheng et al., "Model Based Simulation Study on Corporate-wide Load Dispatch Optimization with Pollution Control," The Instrumentation, Systems and Automation Society, 2003.

Cheng et al., "A Unified Approach to Load Dispatch and Pollution Control Optimization," The Instrumentation, Systems and Automation Society, 2004.

WE Energies—Port Washington, Economic Dispatch, Design Document, Revision 3, Jan. 2004.

Examination Report under Section 18(3) for Application No. GB0520915.0, dated Jul. 14, 2009.

Examination Report for Indian Application No. 2758/DEL/2005, dated Dec. 11, 2012.

Office Action for Canadian Application No. 2,523,935 dated Nov. 3, 2014, 4 pgs.

Search Report for Chinese Application No. 200510109489.7, dated Apr. 16, 2015.

Examination Report under Section 18(3) for Application No. GB0520915.0, dated Mar. 17, 2010.

Further Office Action for CA Application No. 2,523,935 dated Feb. 1, 2016.

* cited by examiner

METHOD AND APPARATUS FOR PROVIDING LOAD DISPATCH AND POLLUTION CONTROL OPTIMIZATION

TECHNICAL FIELD

This patent relates generally to computer software, and more particularly to computer software used in electric power generation and distribution systems.

BACKGROUND

Almost every aspect of life in the twenty-first century involves the use of electric power. Electric power is generally transmitted by electric utility companies (hereinafter referred to as "utilities") to the end users via a complex network of electric power generation and distribution systems. Utilities generate electric power in power plants using a number of different energy sources, including thermal energy, solar energy, nuclear energy, coal, gas, etc. Depending on the type of energy source used by its power generators, a power plant may produce one or more types of pollutants as a by-product of the various processes undertaken by the power generators to generate electricity.

For example, a power plant using a coal burning power generator produces carbon monoxide, sulfur dioxide and other pollutants, whereas a power plant using a nuclear power generator produces radioactive waste material as a pollutant. Due to the environmentally harmful effects of these pollutants, the amounts and types of such pollutants released by power plants is restricted by various regulations. In the United States, the environmental protection agency (EPA) regulates the type and amount of pollution generated by power plants. Utilities that operate power plants producing controlled pollutants in excess of the restricted amounts are generally required to pay penalties.

To control the amount of pollution, power plants use various types of pollution control strategies that either restrict the amount of pollutants produced by the power plants and/or process the pollutants before they are released in the surrounding environment. For example, a coal burning power plant generating sulfur dioxide may use a flue gas de-sulfurization (FGD) system to reduce the amount of sulfur dioxide output to the environment. Similarly, another coal burning power plant that generates nitrogen oxide may use a selective catalytic reduction (SCR) system to reduce the amount of nitrogen oxide output to the environment. Such pollution control systems require use of specific reagents, and therefore power plants using such pollution control systems incur additional pollution control costs. For example, the FGD system uses lime slurry as a reagent to reduce the amount of sulfur dioxide output to the environment, while the SCR system uses ammonia as a reagent to reduce the amount of nitrogen oxide output to the environment.

When determining which power plants to use and at what production level, utilities take a number of different factors into consideration, including the demand for power, the power generation costs for each of the power plants, etc. To minimize the cost of power generation, the utilities typically try to determine an optimum combination of power plants so as to generate the required level of power at a minimum cost. In doing so, utilities may use any of a number of sophisticated mathematical and forecasting models available for planning generation of electricity, including various computer programs generally known as economic dispatch programs, which allow the utilities to make decisions related to the operation of power plants.

Because utilities are generally not allowed to generate pollution above the limits provided by the regulating agencies, such limits are used by the economic dispatch programs as constraints when determining the optimal operating levels of the various power plants. However, because different types of pollutants produced by the various power plants require different methods of pollution control, each of these methods incurs different amounts of pollution control costs. Thus, when determining the optimal operating levels of power plants, it is also necessary to take into account the costs involved in controlling the pollutants.

For example, because coal is a cheaper fuel than natural gas, a coal burning power plant may produce electricity cheaper than a gas burning power plant, however, due to the cost of lime slurry or other reagents used by the coal burning power plant to control the amount of nitrogen oxide emissions, in some circumstances it may be more advantageous to generate electricity using the gas burning power plant than by using the coal burning power plant. Thus, economic dispatch programs should also take into account pollution control costs and levels of pollution outputs in determining the optimal allocation of load demands among various power plants.

The importance of the pollution control cost in determining the load allocation is further underscored by the fast developing pollution credit markets, where a power plant that generates polluting emissions in amounts lesser than regulated emission limits may be able to sell pollution credits to another power plant that generates polluting emissions in amounts greater than regulated emission limits. In fact, it is predicted that in near future, one of the world's most vibrant markets will be dealing with the emission credits for $NO_X$, $SO_2$, and green house gases where companies producing green house gases in amounts higher than their prescribed limits can buy emission credits from companies producing green house gases in amounts lower than their prescribed limits. In presence of such pollution credit markets, it is important that economic dispatch programs determining optimal allocation of load demand among various power plants take into consideration not only the pollution control costs but also the pollution control credits.

BRIEF DESCRIPTION OF THE DRAWINGS

The present patent is illustrated by way of examples and not limitations in the accompanying figures, in which like references indicate similar elements, and in which.

DETAILED DESCRIPTION

Generally speaking, an economic dispatch program allocating load demand of a power generation system among various power plants determines the operational set-points and the pollution control set-points of each of the various power plants in a manner that reduces or optimizes the total operating cost for the power generation system, including pollution control costs. The economic dispatch program includes the load set-points and the pollution control set-points of the various power plants as decision variables in allocating the load demand. The economic dispatch program also takes into consideration the pollution control costs of the various power plants, wherein the pollution control costs of the various power plants may be a factor of the costs of the reagents used by the power plants pollution control systems as well as the cost of the waste produced by the power plant pollution control systems. Alternatively, the economic dispatch program may take into consideration the pollution credits available to the various power plants in allocating the load demand, wherein such pollution control credits may be bought or sold in a pollution control credit market.

Figure 1:
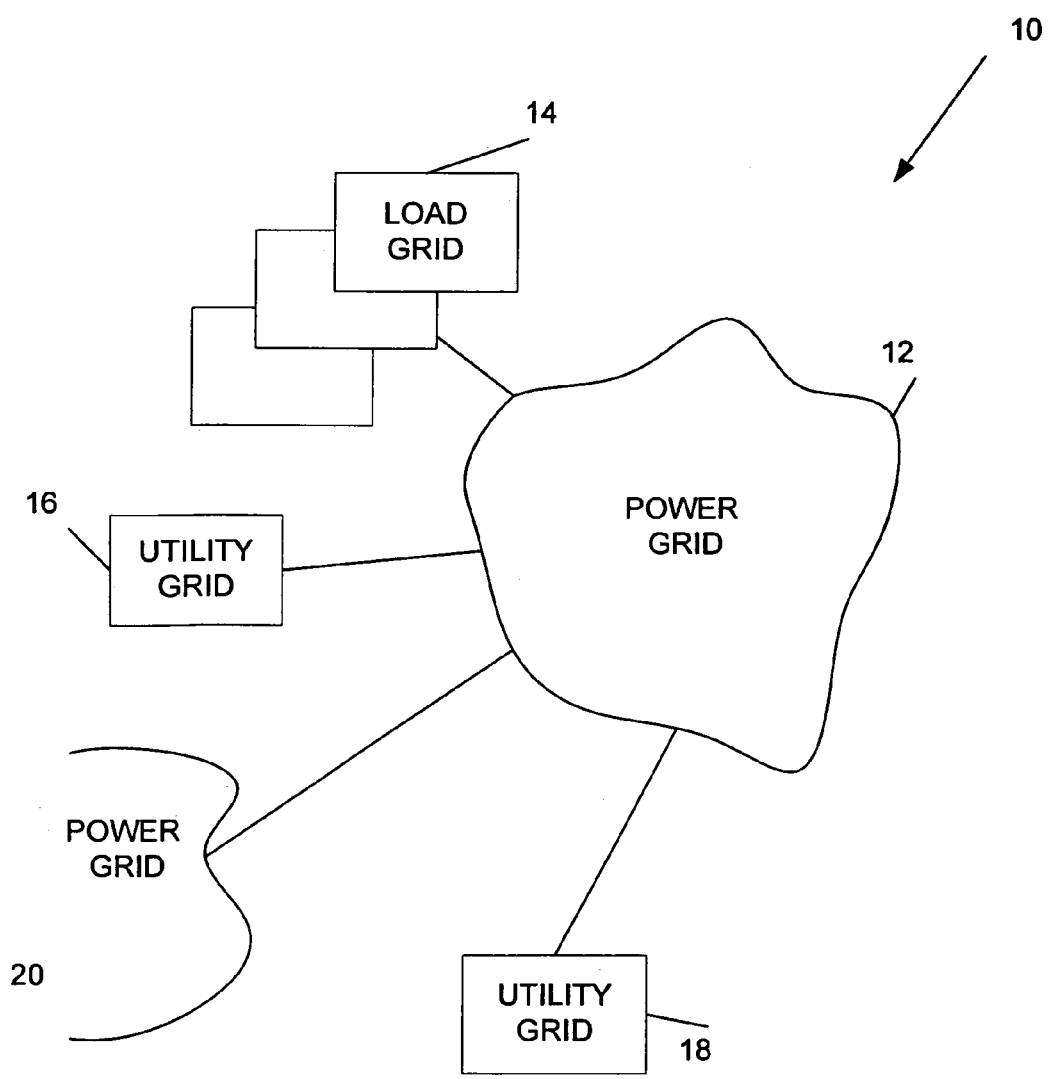
FIG. 1 illustrates a block diagram of an example power distribution system.

FIG. 1 illustrates a power distribution system 10 having a power grid 12, which is connected to a load grid 14, to utility grids 16, 18, and to another power grid 20. The power grid 12 may receive power from the utility grids 16, 18 and from the power grid 20 and may transmit power to the load grid 14. The load grid 14 may provide power to various industrial and residential customers who use power consuming devices, such as air conditioning units, electrical motors, lights, appliances, etc. The utility grids 16, 18 may receive electric power from a number of different power plants, including nuclear power plants, coal burning power plants, etc.

Generally, the power grid 12 may be managed by a grid managing system that is communicatively connected to various remote computers on the utility girds 16, 18. The grid managing system determines the total load demand on the power grid 12 and allocates the load demand to each of the utility girds 16, 18. The grid managing system may use an economic dispatch program to determine the load allocation and the pollution control scheme among the utility grids 16, 18, where the economic dispatch program uses various information collected from the utility grids 16, 18, including the heat rates of the various power plants used by the utility grids 16, 18, the fuel costs, the emission control costs, etc. of the various power plants.

Figure 2:
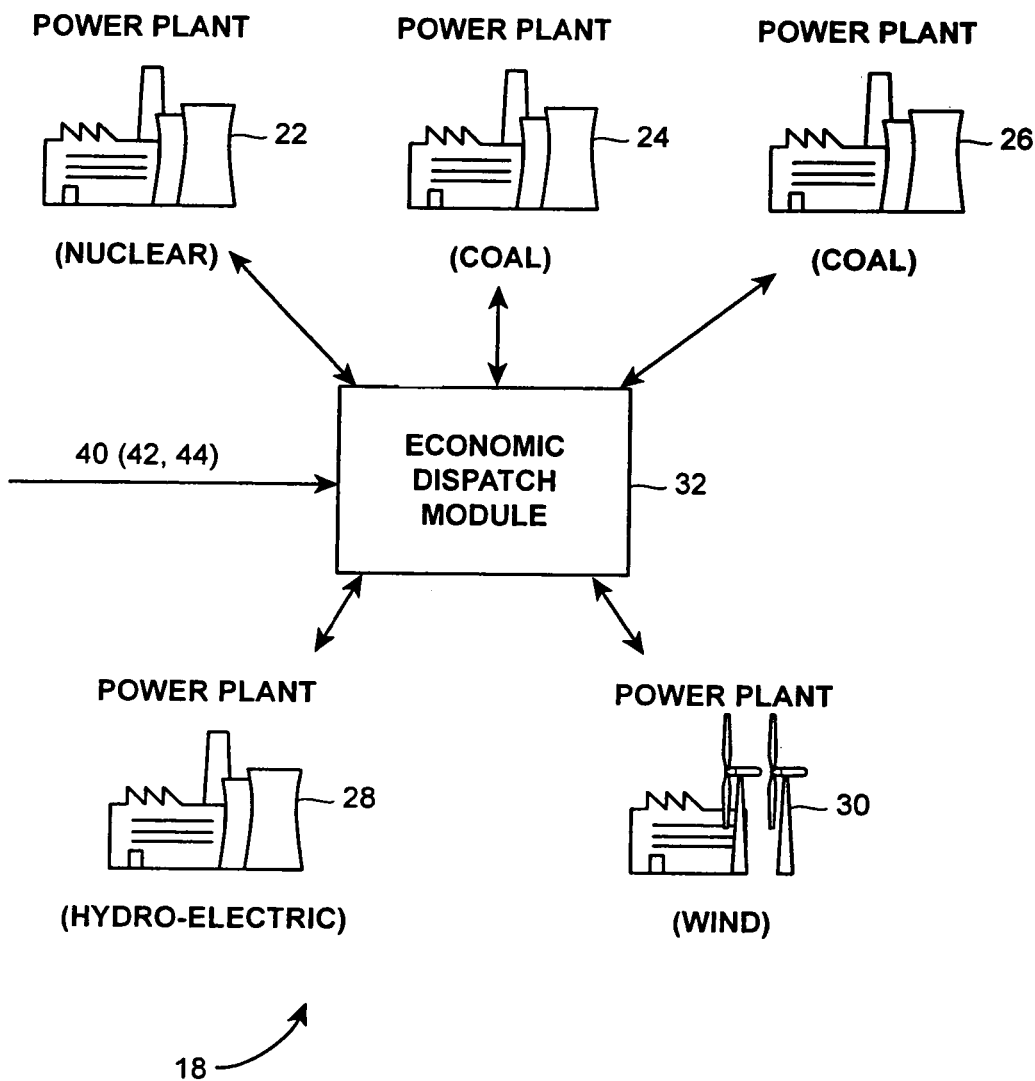
FIG. 2 is an block diagram of a power grid within the power distribution system of FIG. 1.

The utility grid 18 is further illustrated in FIG. 2 as having a number of power plants 22-30, wherein each of the power plants 22-30 is communicatively connected to an economic dispatch module 32 providing load dispatch instructions to the power plants 22-30. The power plants 22-30 may include any of various types of power plants, such as nuclear power plants, hydroelectric power plants, coal-burning power plants, etc. Additionally, each of the power plants 22-30 may include any number of individual power generators. The economic dispatch module 32 receives information from the various power plants 22-30 regarding their operating conditions, heat rates, emission costs, pollution control costs, etc., and determines the allocation of a load demand and a pollution control set-point for each of the power plants 22-30.

The power plants 22-30 may use various-types of power generators and therefore may produce various types of emissions. For example, the power plant 22 may use a coal-fired steam-electric generator which produces nitrogen oxides ($NO_x$) and sulfur dioxide ($SO_2$) emissions. The power plant 22 may use low $NO_x$ (NO, $NO_2$, etc.) burners to reduce the emissions of $NO_x$, while the power plant 22 may use a flue gas de-sulfurization (FGD) system to reduce the $SO_2$ emissions. On the other hand, the power plant 30 may be a combined cycle plant (CCP) that burns gas, and therefore may not produce any $SO_2$ emissions at all. Additional pollutants that may be created within and controlled by (or at least reduced before being emitted by) a power plant or a power generation unit include, for example, carbon monoxide (CO), nitrogen oxide (NO, $NO_2$), mercury (Hg), volume of organic compound (VOC), and greenhouse gases. Generally speaking, greenhouse gases are gaseous components of the atmosphere that contribute to the greenhouse effect (global warming effect). The major natural greenhouse gases are water vapor, which causes most (about 60%) of the greenhouse effect on Earth, carbon dioxide ($CO_2$)(about 26%), and ozone ($O_3$, etc). The remaining fraction is caused by minor greenhouse gases which include methane ($CH_4$) and nitrous oxide ($N_2O$). Industrial greenhouse gases include heavy halocarbons (chlorinated fluorocarbons) such as CFC, HCFC-22 molecules including freon and perfluoromethane, and sulphur hexafluoride ($SF_6$).

The economic dispatch module 32 receives an operating requirement 40 from the power grid 12, wherein the operating requirement 40 includes a total load demand 42 and a total emission allowance 44. The economic dispatch module 32 allocates the load demand 42 and the emission allowance 44 among the power plants 22-30 in a manner such that the total load generated by the power plants 22-30 is at least equal to the load demand 42 and such that the total emission output by the power plants 22-30 is less than the emission allowance 44. The load demand 42 may specify the amount of power to be delivered by the utility grid 18, the time and place of the delivery of the power, etc. The economic dispatch module 32 may use various types of information associated with the power plants 22-30, such as the availability, the operating condition and the efficiency of each of the power plants 22-30, the emission output levels of the power plants 22-30, etc., in determining how to best allocate the load demand 42 and the emission allowance 44 among the power plants 22-30. If desired, the economic dispatch module 32 may be implemented as software stored on a memory of a computer and operable on a controller of the computer, as hardware, as firmware or as any combination thereof.

Figure 3:
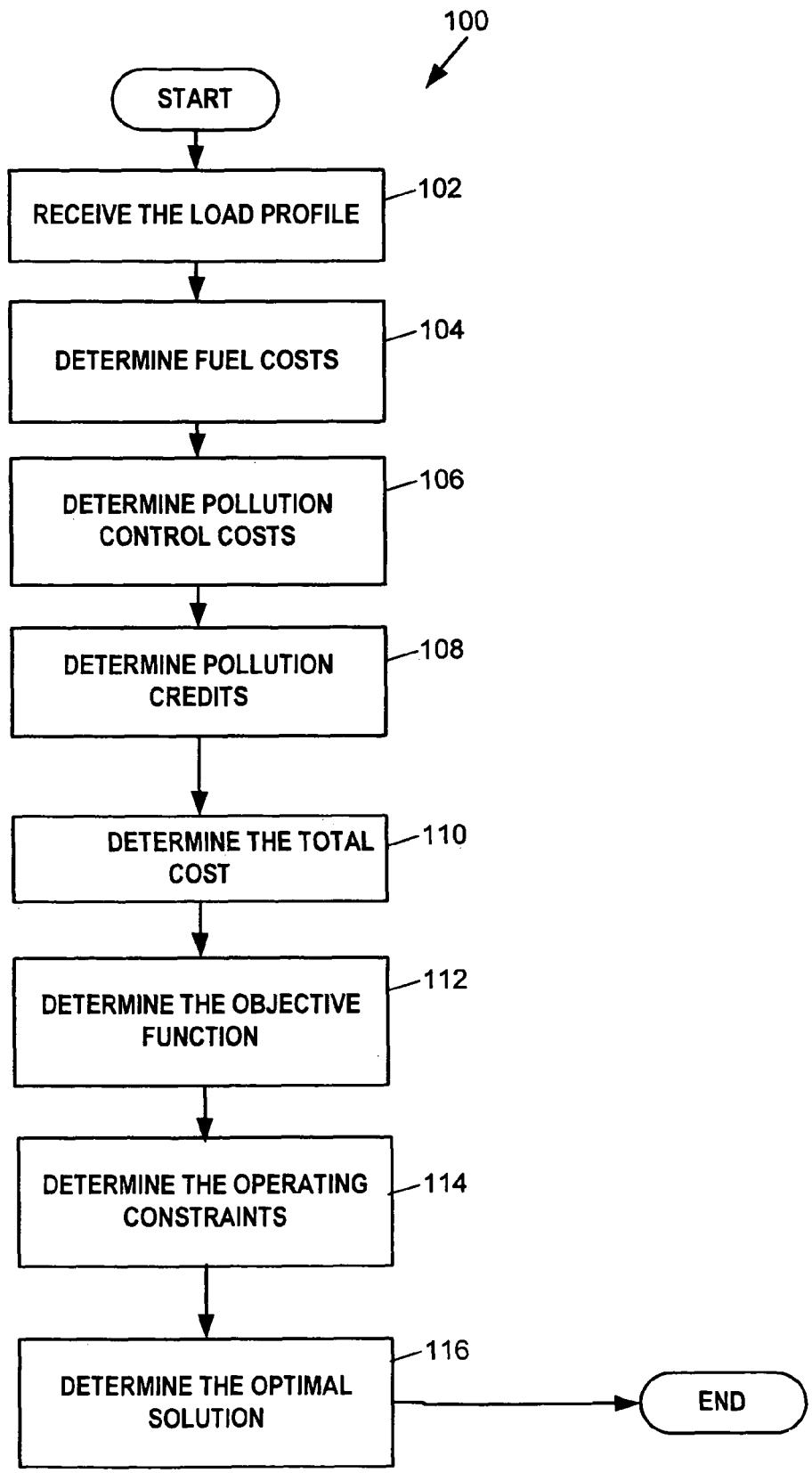
FIG. 3 is a flowchart of an economic dispatch program used by the power grid of FIG. 2.

FIG. 3 illustrates a flow chart of an example economic dispatch program 100 that may be implemented by the economic dispatch module 32. Generally speaking, the economic dispatch program 100 determines the allocation of the load demand 42 and the emission allowance 44 among various power plants 22-30 by solving an objective function to determine an optimal operation point of the utility grid 18. To perform such an optimization, the economic dispatch program 100 receives the load demand 42 and the emission allowance 44, various information about the power plants 22-30, such as parameters used to define the operation of the power plants 22-30, values of some of these parameters, relationships between these parameters, and constraints on the operation of the power plants 22-30.

Specifically, a block 102 receives the load demand 42, where the load demand 42 specifies the total load of the utility grid 18 from a beginning time $T_0$ to an ending time T.

Generally, a load demand supplied from the power grid 12 to the utility grid 18 increases the load from an initial level to a peak level in a first time period and then holds the load at the peak level for a second time period. To reflect this situation, the load demand 42 is shown as including a load ramp between the beginning time $T_0$ to a ramp time $T_e$, where the load demand is $L_0$ at time $T_0$ and $L_e$ at the ramp time $T_e$. From the ramp time $T_e$ to the ending time T, the load is assumed to be constant at $L_e$. It is also assumed that the overall time period $\{T_0,T\}$ (where T is greater than or equal to $T_e$) is divided into N time segments $\{t_0,t_1\}$, $\{t_1,t_2\}$ ... $\{t_{N-1},t_N\}$ with $t_0=T_0$ and $t_N=T$, where the load at the end of each of the time segments is denoted by $L_1, L_2, \ldots, L_N$. If the load ramp between times $T_0$ and $T_e$ is assumed to be a linear ramp, the intermediate target loads $L_k$ ($k=1, \ldots, N$) can be simply computed as a linear interpolation between the initial load $L_0$ and the final load $L_e$ by the following equation 1:

$$L_k = L_0 + k \cdot (L_e - L_0)/(T_e - T_0) \text{ (for } t_k \leq T_e\text{)) and}$$

$$L_k = L_e \text{ (for } t_k > T_e\text{)} \quad (1)$$

Figure 4:
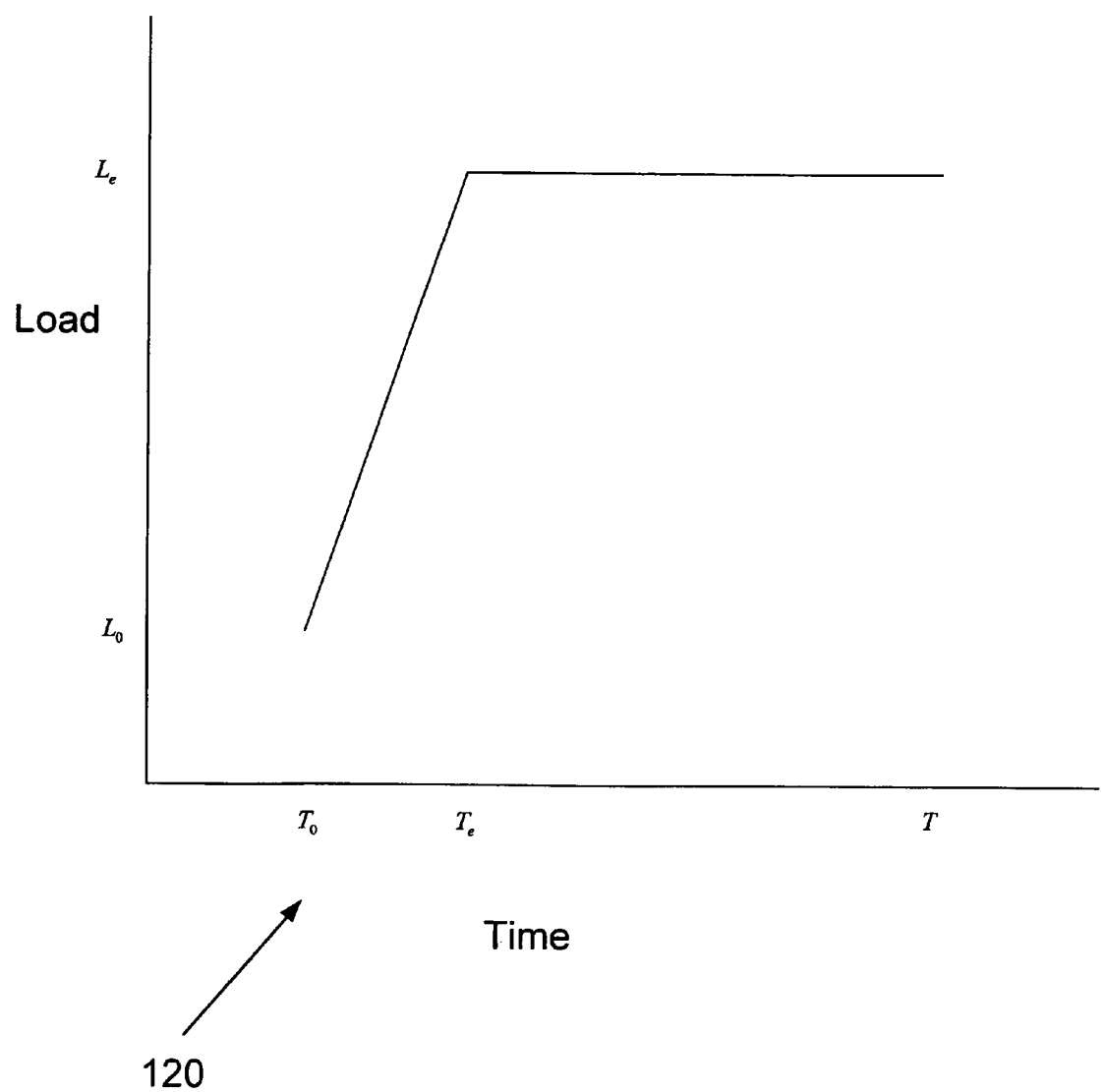
FIG. 4 illustrates a load demand function received by the power grid of FIG. 3.

A load profile 120 of the load demand as given by the equation 1 is illustrated in FIG. 4. While the load profile 120 is represented by a linear equation 1, in an alternate case, the load profile 120 may be given by or expressed as a non-linear equation. Moreover, it should be noted that the number of time segments N used to divide the load profile 120 determines the complexity of the optimization to be performed by the economic dispatch program 100. A larger value of N will provide a finer load profile 120, while increasing the computational burden of the economic dispatch module 32.

Subsequently, a block 104 determines fuel costs associated with operating the power plants 22-30 so as to achieve the load profile 120. For illustration purposes, suppose that the power plants 22-30 are represented by an index from 1 to n. Thus, the power plant 22 is denoted as the plant 1, the power plant 24 is denoted as the plant 2, etc. In this case, the fuel consumption cost associated with the $i^{th}$ unit ($i=1$ to n) at a time $t_k$ can be expressed as:

$$F_i^k = L_i^k \cdot H_i^k \cdot f_i \quad (2)$$

Where $L_i^k$=load for the $i^{th}$ unit at time $t_k$;
$H_i^k$=heat rate for the $i^{th}$ unit at time $t_k$; and
$f_i$=fuel price for the $i^{th}$ unit.

The values of the heat rates $H_i^k$ for the various power plants 22-30 and the fuel prices $f_i$ may be communicated to the economic dispatch module 32 in real time or, alternatively, these values can be stored in a memory of the economic dispatch module 32. While some of the values used by the equation 2 may be constant, other values may be variable, and may be represented by one or more mathematical models. For example, the fuel price $f_i$ for the $i^{th}$ unit may be constant for a given application of the economic dispatch module 32, while the heat rate $H_i^k$ for the $i^{th}$ unit at time $t_k$ is generally a variable that may be expressed as a function of a number of characteristics of each of the power plants 22-30. For many of the plants 22-30, the heat rate $H_i^k$ may be provided by a non-linear relationship represented by, for example, a polynomial regression model, by a feed-forward neural network model, or by some other mathematical model.

While the illustrated implementation of the economic dispatch function 100 considers the total fuel cost only as a function of the fuel prices, the heat rates and the load function, in an alternate implementation, a number of other relationships may also be considered. For example, in one implementation of the economic dispatch program 100, a reactive capability curve of a power generating unit representing a relationship between the reactive output power, the real output power, and the efficiency of the power generating unit may also be used in determining the total fuel cost associated with operating the power plants 22-30.

Subsequently, a block 106 determines various pollution control costs associated with the power plants 22-30. As discussed above, some of the power plants 22-30 may be coal burning power plants that generate pollutants such as $SO_2$, $NO_x$, etc. Suppose that the power plant 22 is a coal burning power plant that uses a scrubber reagent to control the output of the $SO_2$. For example, a coal burning plant may use limestone as the scrubber reagent in a flue gas desulfurization (FGD) system to control the emissions of $SO_2$. Similarly, another power plant 24 may have a selective catalytic reduction (SCR) system that uses ammonia as a reagent to control the emissions of $NO_x$. Here the cost of limestone for the plant 22 and the cost of ammonia for the plant 24 are pollution control costs. Moreover, depending upon the type of reagent used, there is generally a certain amount of waste that is produced, and the cost of removal of such waste should also be considered as part of pollution control cost. In any case, the overall pollution control cost can be determined in terms of $/lb of reagent used. Therefore, for the $i^{th}$ unit, the cost of pollution control at time $t_k$ can be expressed as:

$$R_i^k = \sum_{j=1}^{m} \{S_{i,j}^k \cdot p_{i,j}\} \quad (3)$$

Where $S_{i,j}^k = j^{th}$ reagent flow for the $i^{th}$ unit at time $t_k$;
$p_{i,j} = j^{th}$ reagent price for the $i^{th}$ unit; and
m=total number of pollutant types being controlled.

Typical reagents that may be used by the power plants 22-30 include ammonia used in an SCR system and limestone or lime slurry used in an FGD system. Of course, some of the plants 22-30 may be designed so as not to produce any pollutants at all, in which case, the cost of pollution control for those plants will be zero. The costs of pollution control may be communicated to the economic dispatch module 32 in real time or, alternatively, their values may be stored on a memory of the economic dispatch module 32.

Subsequently, a block 108 determines the credits for various pollutants available to the power plants 22-30. Generally, the credits for the pollutants are applied to the difference between the actual amount of pollutant produced and the allowable amount of pollutants for any of the power plants 22-30, where the allowable amount can be specified in several ways. For example, for $SO_2$, the allowable amount is specified in tons/year, for $NO_x$, the allowable amount is specified in lbs/mBTU, etc. It should be noted that the allowable overall amount of pollutant as well as the pollution limits for each of the power plants 22-30 are hard constraints, thus ensuring that any optimal solution generated by the economic dispatch module 32 cannot violate any regulation limit controlling the total amount of these pollutants. Thus, total emission credits available for the $j^{th}$ pollutant at time $t_k$ can be expressed as:

$$C_j^k = \left(X_j^k - \sum_{i=1}^{n} Z_{i,j}^k\right) \cdot c_j \quad (4)$$

Where $X_j^k$=total regulation limit for the $j^{th}$ pollutant at time $t_k$;
$Z_{i,j}^k$=$j^{th}$ pollutant produced by the $i^{th}$ unit at time $t_k$; and
$c_j$=credit (or bonus price) for the $j^{th}$ pollutant.

After determining the cost of fuel, the cost of pollution control and the pollution control credits for each time period $t_k$, a block 110 determines the total cost $J_k$ of providing load $L_k$ by adding these costs together. This operation can be expressed as:

$$J_k = \sum_{i=1}^{n} F_i^k + \sum_{i=1}^{n} R_i^k - \sum_{j=1}^{m} C_j^k \qquad (5)$$

Note that while the equation 5 above considers only the cost of fuel, the cost of pollution control and the pollution credits in determining the total cost $J_k$, in an alternate implementation, other costs such as cost of transmitting power, the cost of fuel storage, etc., may also be considered in determining the total cost $J_k$.

Using the total cost $J_k$ for each time period $t_k$, the aggregate cost J of the utility grid 18, for providing load during the time interval $\{T_0, T\}$ can be calculated as:

$$J = \sum_{k=1}^{N} J_k \qquad (6)$$

Subsequently, a block 112 determines the objective function to be used by the economic dispatch module 32. In one particular implementation of the economic dispatch module 32, the objective may be to minimize the total cost of operating the utility grid 18, in which case the objective function will be the minimization of the total cost J. However, in an alternate implementation, an alternate objective, such as minimization of emissions, minimization of the time required to ramp the load, etc., may be used. Note that in formulating the objective function in the form of the equation 6, the pollution credits are expected to be realized immediately. However, in reality, because it takes time to realize the pollution credits, other factors such as time value of money, etc., may also need to be considered.

After determining the objective function for the economic dispatch module 32, a block 114 determines various constraints to be applied in solving the objective function. Generally speaking, such constraints may include various load constraints, total emission constraints, etc. In the present case, various constraints applicable to operation of the utility grid 18 are given below by equations 7 through 11.

Specifically, equations 7 and 8 below are the load constraints, with equation 7 specifying the total load to be delivered by all of the power plants 22-30 and equation 8 specifying the minimum load and the maximum load to be generated by each of the power plants 22-30.

$$\sum_{i=1}^{n} L_{i,k} = L_k \qquad (7)$$

$$L_{i,min} \leq L_{i,k} \leq L_{i,max} \qquad (8)$$

In equations 7 and 8, $L_{i,k}$ is the load demand for the $i^{th}$ power plant at time $t_k$, and $L_{i,min}$ and $L_{i,max}$ are the minimum load and the maximum load for the $i^{th}$ power plant.

The unit ramp constraint providing the maximum change in the load output of the power plants 22-30 is given by equation 9, wherein $M_i$ is the maximum ramp rate for the power plants 22-30 during any time interval $\{t_{k-1}, t_k\}$.

$$-M_i \leq L_{i,k+1} - L_{i,k} \leq M_i \qquad (9)$$

The total emission allowed for the utility grid 18 is a function of the limits on the various pollutants emitted by the power plants 22-30. If, for the $j^{th}$ pollutant, the maximum allowable pollution that can be produced by the $i^{th}$ power plant is given by $X_{i,j}$ and the total emission of $j^{th}$ pollutant for the $k^{th}$ time period is given by $X_j^k$, then the emission constraints on the operation of the utility grid 18 may be given by the equations 10 and 11 as follows:

$$\sum_{i=1}^{n} Z_{i,j}^k \leq X_j^k \qquad (10)$$

$$Z_{i,j}^k \leq X_{i,j} \qquad (11)$$

Note that for equations 7-11, k=1, . . . , N and denotes each of the N time periods in which the load profile 120 is divided, i=1, . . . , n and denotes each of the various power plants 22-30, and j=1, . . . , m and denotes each of the various pollutants or pollutants emitted by the power plants 22-30.

Subsequently, a block 116 solves the objective function of the utility grid 18 subject to the constraints to determine an optimal solution. It should be noted that, in any case, more than one optimal solution may exist and the block 116 needs only solve until it finds one such optimal solution, which is a solution that is minimizes (or maximizes) the objective function within some possible operating region of the system. A specific optimal solution does not need to be the most optimal in terms of the entire operating space of the system, but only, for example, optimal in a regional operating space.

Generally, an objective function subject to a number of constraints may be solved using a non-linear optimization routine. An implementation of the economic dispatch module 32 may use an iterative process where a candidate solution for the objective function is selected within the constraints and values of various variables are iteratively changed until an optimal solution (e.g., one which minimizes the objective function) is obtained. For example, a set of values for the various intermediate loads $L_k$ may be selected as a starting point and the optimal values of the intermediate loads $L_k$ can be found iteratively. Similarly, the values of the pollution levels of the power plants 22-30, as given by $Z_{i,j}^k$ may also be selected as part of a candidate solution and optimal values of the pollution levels $Z_{i,j}^k$ may be determined iteratively.

In an implementation of the economic dispatch module 32, an evolutionary algorithm may also be used to iteratively solve the objective function subject to one or more constraints. In an evolutionary algorithm, a set of candidate solution points within the constraints is selected, a set of localized solutions corresponding to the set of candidate solution points is obtained and one of the set of localized solutions is selected as the optimal solution of the objective function.

Using the evolutionary algorithm to solve the objective function 32 ensures that even if the objective function has multiple localized optimal values, the most optimal of these localized optimal values is obtained. The evolutionary algorithm may be implemented in the form of software, hardware, firmware or any combination thereof. For example, the evolutionary algorithm may be implemented using one of the various off-the-shelf mathematical solution programs, such as the Evolutionary Solver® program available from Frontline Systems, Inc. Functioning of an evolutionary algorithm is explained in further detail in U.S. patent application Ser. No. 10/876,431 dated Jun. 25, 2004 and entitled "A Method and Apparatus for Providing Economic Analysis of Power Generation and Distribution," which is incorporated herein in its entirety.

It should also be noted that the accuracy of the optimal operating solution obtained by the economic dispatch module 32 will depend on the accuracy of the data provided to the economic dispatch module 32. Many of the underlying models used in obtaining the optimal solution may have time-varying characteristics. For example, the heat rate models of the power plants 22-30 vary over time due to equipment aging and process drift. As a result, to get an accurate optimal solution, these heat rate models need to be updated regularly.

Having described the functioning of the economic dispatch program 100 above, an application of the economic dispatch program 100 to a network of power generating devices is described below.

Figure 5:
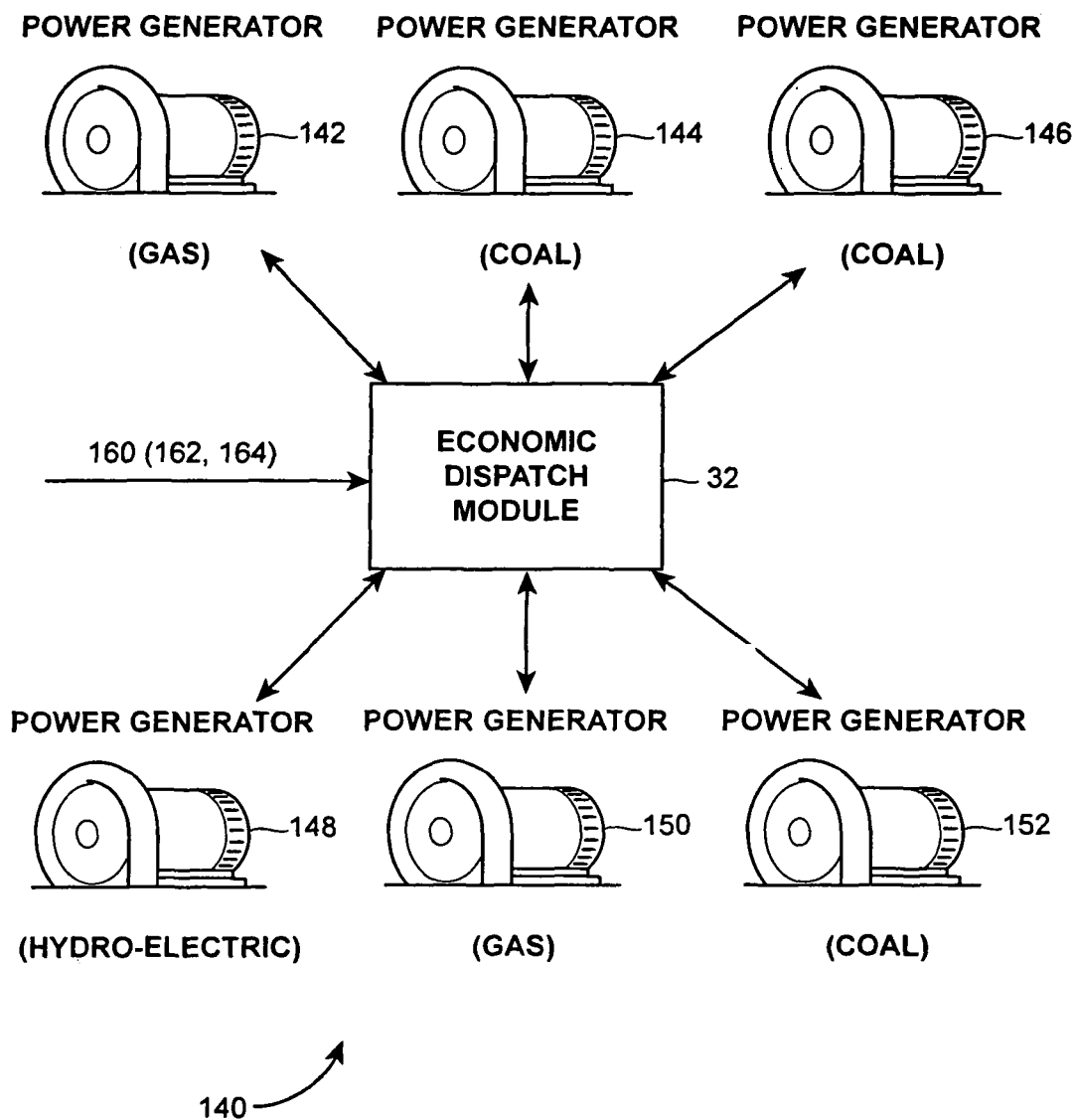
FIG. 5 illustrates a block diagram of a power network having a number of power generation units.

In particular, FIG. 5 illustrates an exemplary power network 140 including six power generating units 142-152, where each of the units 142-152 may be any of a gas burning power unit, a coal-burning unit, a hydro-electric unit, etc. In a particular implementation, it is assumed that the unit 142 is a coal-fired steam-electric 200 MW capacity unit, which contains low $NO_x$ burners that keep the $NO_x$ emission rate at 0.2 lb $NO_x$/mBTU. The $SO_2$ emissions of the unit 142 are controlled by use of a lime spray dryer (LSD) flue-gas desulphurization (FGD) system that has a maximum pollutant removal efficiency of 90%, and that uses lime slurry as a reagent. The unit 144 is a 120 MW coal fired plant that is similar to the unit 142 except that it contains a duct sorbent injection (DSI) FGD system, using commercially available limestone ($CaCO_3$) or hydrated lime ($Ca(OH)_2$) as a sorbent, and having a maximum pollutant removal efficiency of 50%. The unit 146 is a 700 MW coal-fired steam-electric unit and the unit 148 is an 800 MW coal-fired steam-electric unit. Each of the units 146 and 148 contains a selective catalytic reduction (SCR) system to reduce $NO_x$ emissions, wherein ammonia ($NH_3$) is used for reducing the levels of $NO_x$. Finally each of units 150 and 152 is a 250 MW combined cycle plant (CCP), each having two combustion turbo-generators (CTGs), two heat recovery steam generators (HRSGs), and two steam turbo-generators (STGs).

Figure 6:
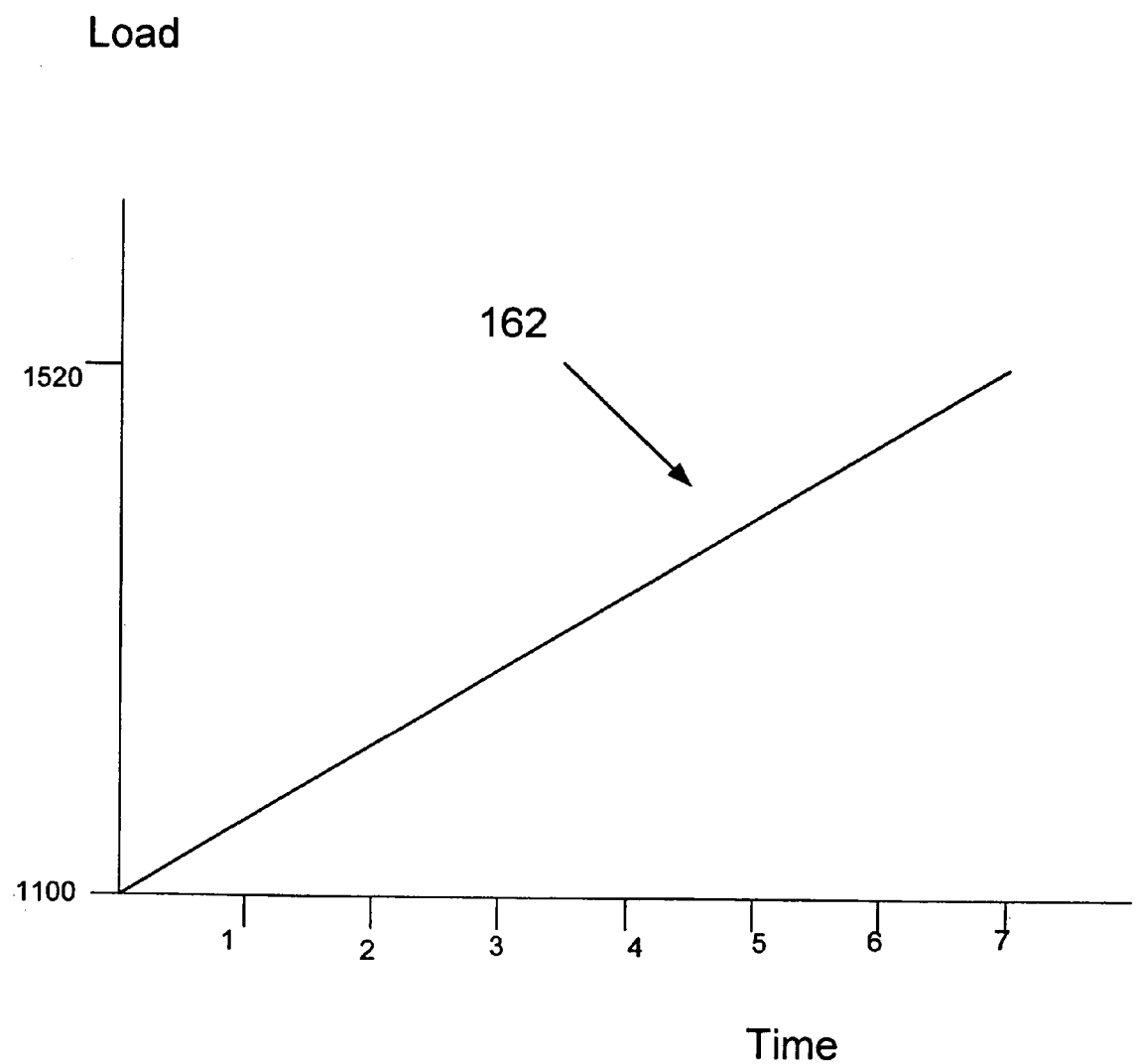
FIG. 6 illustrates a load demand function received by the power network of FIG. 5.

Now, applying the economic dispatch program 100 to the power network 140, the block 102 receives an operating instruction 160 from a power grid, such as the power grid 12, managing the power network 140. The operating instruction 160 includes a load demand 162 specifying the load to be provided by the power network 140 and an emission allowance 164 that specifies the total pollution level that may be generated by the power network 140. In the present case, suppose that the load demand 162 is to ramp the load output of the power network 140 from 1100 MW to 1520 MW in about 84 minutes. This load demand 162 is further illustrated in FIG. 6, wherein each unit on the x-axis represents 12 minutes. The emmission allowance 164 for the power network 140 is assumed to be 5000 tons of $SO_2$ emissions and 1300 tons of $NO_x$ emissions.

Figure 7:
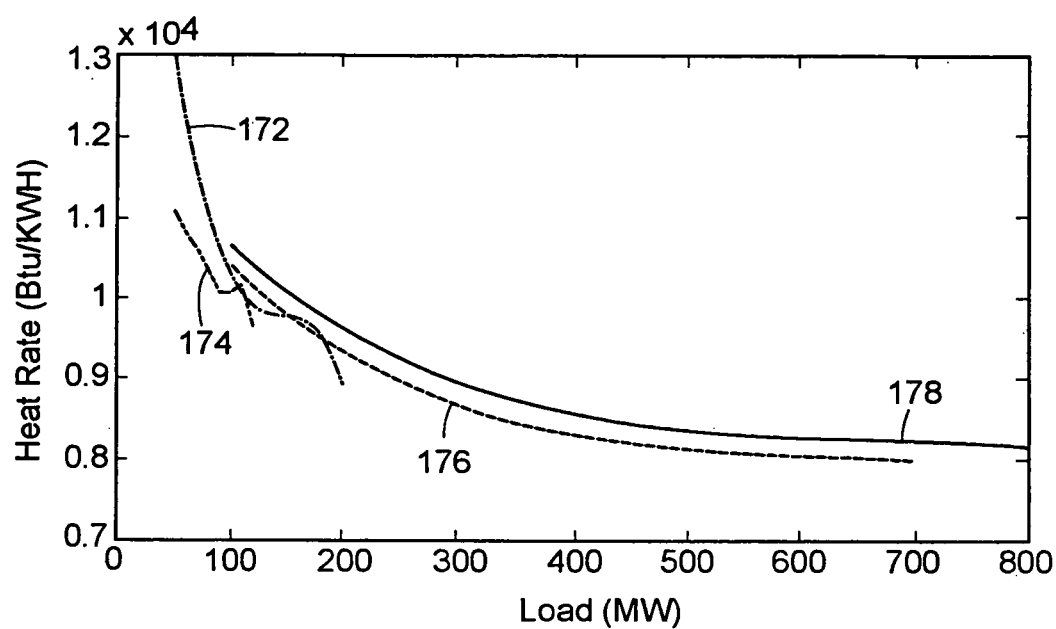
FIG. 7 illustrates various heat rate curves of the power generation devices within the power network of FIG. 5.
Figure 7:
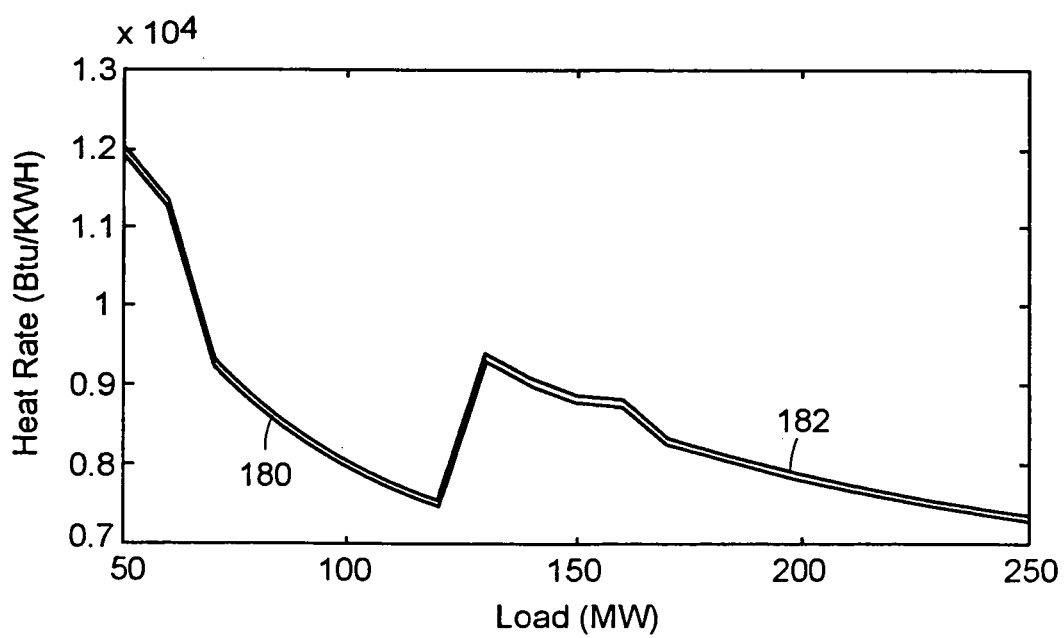

The block 104, which receives the fuel costs ($f_j$) and the heat rate curves ($H_i^k$) for each of the units 142-152, uses these parameters, as specified in equation 2, to determine the total fuel cost for generating the total load specified by the load demand 162. In the present case, the fuel costs for the units 142-152 are given below in Table 1, whereas the heat rate curves for the units 142-152 are illustrated in FIG. 7 by the heat rate curves 172-182, respectively. Note that each of the heat rate curves specifies the amount of heat necessary to generate a KWH of power. As explained above, the optimal values of the loads to be generated by each of the units 142-152, as specified by $L_i^k$ equation 2, may be determined in an iterative manner.

TABLE 1

| Unit | Fuel Cost ($/mBTU) |
|---|---|
| 142 | 1.30 |
| 144 | 1.30 |
| 146 | 1.30 |
| 148 | 1.30 |
| 150 | 2.10 |
| 152 | 2.10 |

Subsequently, the block 106 receives the pollution control costs ($p_{i,j}$) for each of the units 142-152, where such pollution control costs may be specified by the costs of the reagents used by the units 142-152. These pollution control costs are used by equation 3, to determine the total pollution control cost of the power network 140. In the present case, the pollution control costs for the units 142-152 are given below in Table 2.

TABLE 2

| Unit | Reagent Used | Cost of Reagent ($/lb) |
|---|---|---|
| 142 | Lime Slurry | 0.045 |
| 144 | Lime | 0.04 |
| 146 | $NH_3$ | 0.11 |
| 148 | $NH_3$ | 0.11 |
| 150 | — | |
| 152 | — | |

The block 108 of FIG. 3 receives the pollution control credits ($c_j$) for each of the pollution generated by the units 142-152, which are used in equation 4 to determine the total pollution credit for the power network 140. In the present case, the pollution credits for the pollutants generated by the units 142-152, namely $SO_2$ and $NO_2$, are given below in Table 3.

TABLE 3

| Pollutant | Credit ($/lb) |
|---|---|
| $SO_2$ | 0.05 |
| $NO_2$ | 2.00 |

Subsequently, using equation 5, the block 110 determines the total cost to the power network 140 for generating the load specified by the load demand 142. Supposing that in the present case the objective is to minimize the total cost of operating the power network 140 in meeting the load demand 142, the block 112 determines that equation 5 is also the objectives function for the power network 140.

Upon determining the objective function for the power network 140, the block 114 determines various constraints on the operation of the power network 140. The constraints on the power network 140 may be temporary operational constraints and/or long term structural constraints. For example, in the present case, suppose that one of the temporary constraints on the power network 140 is that the unit 148 is out of service.

Other constraints on the power network 140 may include one or more of the constraints specified by equations 7-11, as applied to the power network 140. For example, the constraints denoted by the equation 7, representing the total intermediate target loads, can be obtained load demand 142, as shown in the FIG. 6. The maximum and the minimum loads for each of the power units 142-152, represented by the equation 8, are provided below in Table 4.

TABLE 4

| Unit | Minimum Load (MW) | Maximum Load (MW) |
|---|---|---|
| 142 | 40 | 200 |
| 144 | 25 | 120 |
| 146 | 140 | 700 |
| 148 | 140 | 800 |
| 150 | 50 | 250 |
| 152 | 50 | 250 |

Finally, referring to the ramp constraint providing maximum change in the load output of the power plants 22-30 and represented by equation 9, suppose that in the present case, the maximum rate at which each of the various units 142-152 can ramp their load outputs is 7 MW per minute.

The constraints on the total emission by the power network 140 as represented by equation 10 and as discussed above, are equal to 5000 tons for $SO_2$ and 1300 tons for $NO_x$. Referring to the plant level pollution constraints represented by equation 11, it is assumed that in the present case, there are no such plant level constraints imposed on the units 142-152. Generally, under the current environmental regulations, emission levels for $SO_2$ are limited based on a group of plants in a region, and the emission levels for $NO_x$ are limited per individual plant. Therefore, in a different implementation, the individual plant level emission limits may also be taken into consideration.

Having determined the objective function and the constraints of the power network 140, the block 116 determines the optimal solution for operating the units 142-152, specifying the operating points for each of the units 142-152 at various points on the load demand ramp 162. The optimal operating points for the units 142-152 in terms of their load output levels, is illustrated by a load ramp profile 190 depicted in FIG. 8, whereas the optimal operating points for the units 142-152 in terms of their pollution control set-points, is illustrated by a scrubber efficiency profile 210 depicted in FIG. 9.

Figure 8:
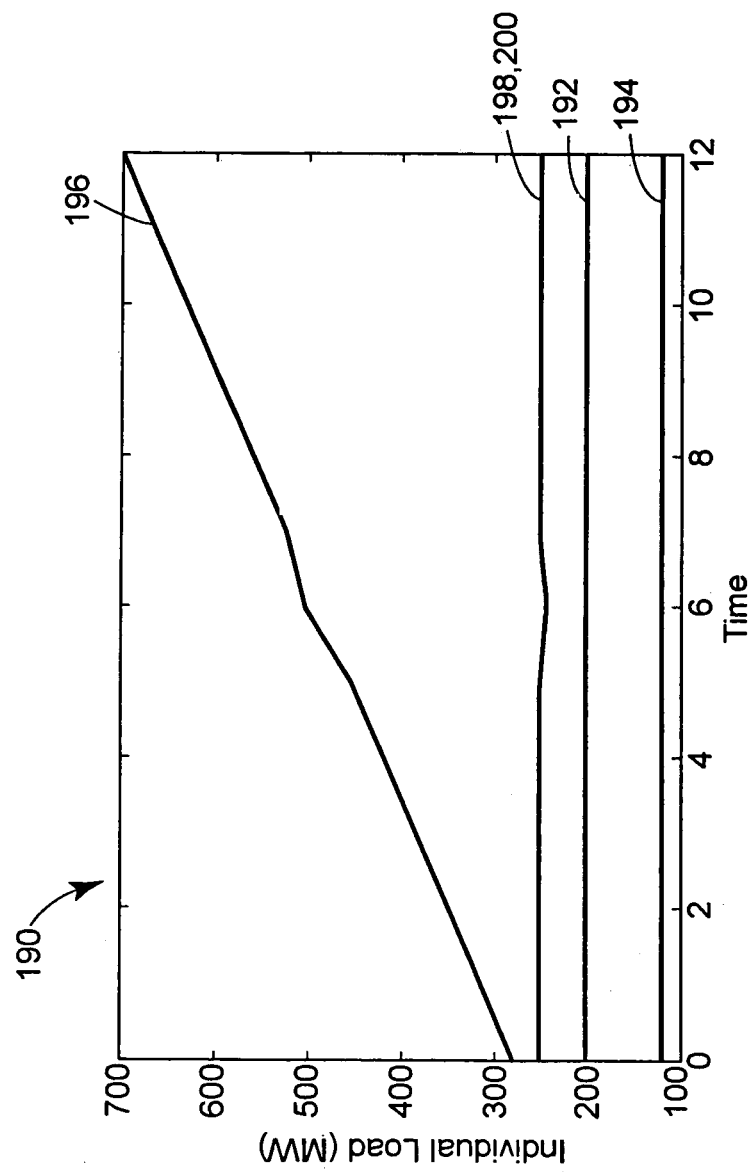
FIG. 8 illustrates optimal load set-points for the power generation devices within the power network of FIG. 5.
Figure 9:
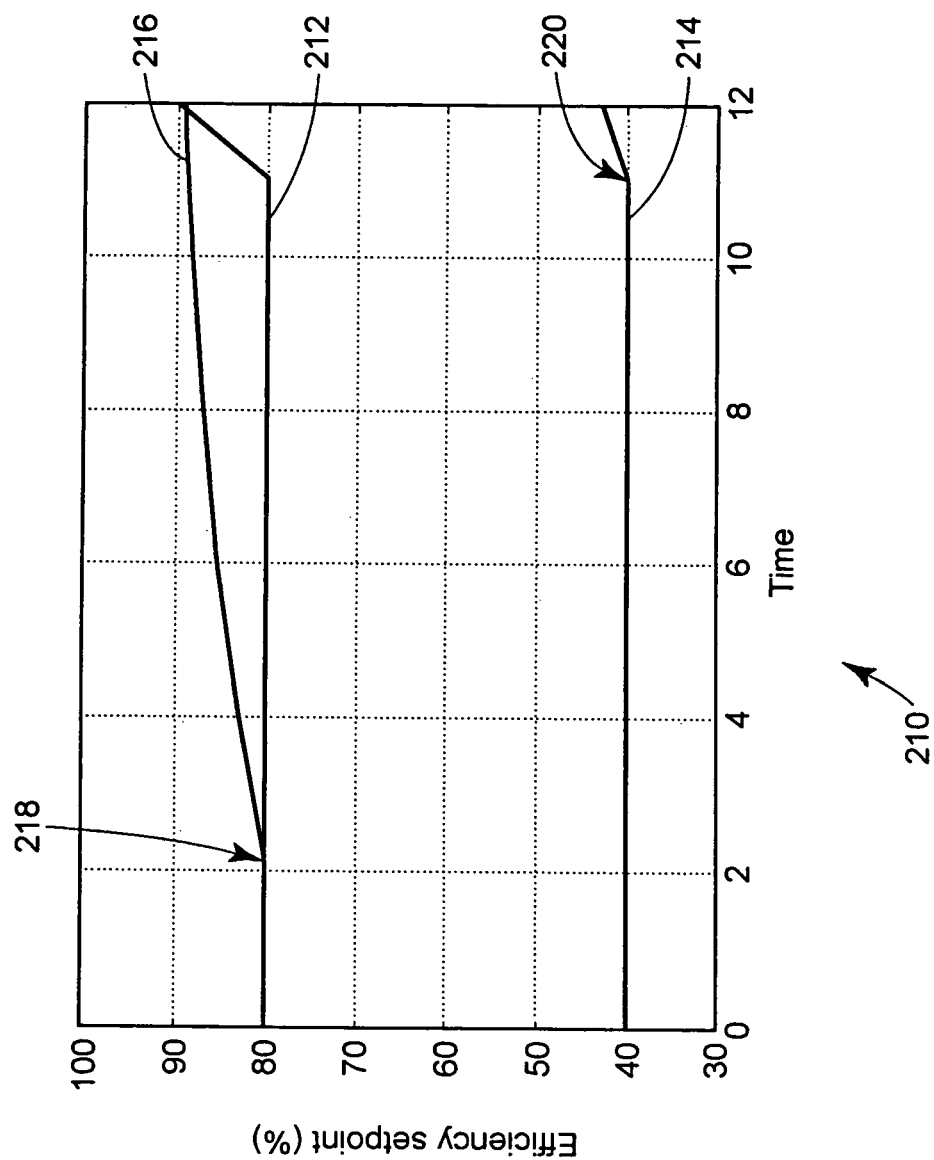
FIG. 9 illustrates optimal scrubber set-points for the power generation devices within the power network of FIG. 5.

Specifically, in FIG. 9, the load ramps for each of the units 142-146 and 150-152 are represented by the lines 192, 194, 196, 198 and 200, respectively. The load ramp profile 190 in FIG. 8 shows that at the beginning of the load ramp, where the total required load output is 1100 MW, the units 142, 144, 150 and 152 are each brought to their respective full load capacity. Given that the unit 148 is assumed to be out of service, at the 1100 MW level, only the unit 146 has a room to ramp up to meet the increasing demand.

As shown by the load ramp profile 190, the units 142 and 144 are operated at full capacity from the 1100 MW level to the 1520 MW level. However, at least for a part of the load ramp, specified by the region around an operating point 202, the load on the unit 148 is slightly increased, while the loads on the units 150 and 152 are slightly decreased.

Now referring to the scrubber efficiency profile 210 illustrated in FIG. 9, the scrubber set-points for the units 142-146 are depicted by the lines 212, 214 and 216, respectively. As seen in FIG. 9, at the beginning of the ramp, the scrubber set-points for all of the units 142-146 are kept at their minimum to keep the total cost down. As the unit 146 ramps up, at a certain point 218 (total load of about 1170 MW), the SCR system of the unit 146 starts to go up due to the total limit imposed on the emission of $NO_x$. Thereafter, at about the total load output of 1480 MW, as represented by the point 220, the FGD set-points of the units 142 and 144 are also raised in order to meet the pollution regulation constraints on emission of $SO_2$. Note that the economic dispatch program 100 sets the scrubber set-points for the units 142-146 in a manner so that they are always below the maximum pollutant removal efficiencies of these units.

While FIGS. 8 and 9 represent the load output set-points and the scrubber set-points of the units 142-152 on separate lines, it is important to keep in mind that the economic dispatch program 100 determines the load output set-points and the scrubber set-points simultaneously, and in a manner so that not only the total cost of providing output represented by the load demand 162 is minimized and so that the emission output by the power network 140 is also below the emission allowance 164.

Of course, while the application of the economic dispatch program 100 to the power network 140 minimizes the cost of operating the power network 140, in an alternate situation, the economic dispatch program 100 can be applied to the power network 140 to meet an alternate objective, which may be for example, the minimization of $NO_x$ emissions, or some optimal combination of these two objectives. In yet another alternative implementation, the economic dispatch program 100 may be applied to the entire power grid 12 to allocate the total demand of the power grid 12 among the utility grids 16, 18, so that the total cost of the operating the power grid 12 is minimized, while the total emission output by the power grid 12 is below a specified grid level emission allowance.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of operating a power generation system having a plurality of power generation devices, each of the power generation devices including one or more power generating units that produce an amount of energy based on a load set-point, and at least one of the power generation devices including one or more pollution control devices that are controllable independent of the power generation units and that operate at different levels based on pollution control set-points, wherein different values of a pollution control set-point cause a pollution control device to operate at different operating points to affect the amount of emission of pollutants emitted by a power generation device during operation of the power generation device, the method comprising:

obtaining, using a processor of a computing device, an objective function of the power generation system, wherein the objective function provides cost of operating the power generation system as a function of a plurality of variables, the plurality of variables including a load set-point for one of the power generating units of at least one of the plurality of power generation devices and a pollution control set-point of a pollution control device for the at least one of the plurality of power generation devices;

obtaining, using the processor of the computing device, a plurality of operating constraints of the power generation system;

obtaining, using the processor of the computing device, an optimal solution for the objective function within the plurality of operating constraints of the power generation system, wherein a candidate solution for the objective function is selected within the constraints and values of various variables are iteratively changed until the optimal solution is obtained, wherein the optimal solution for the objective function is representative of the cost of operating the power generation system, and wherein the cost of operating the power generation system includes a cost of operating the plurality of power generation devices and a cost of operating the one or more pollution control devices;

determining, using the processor of the computing device, load set-points and pollution control set-points, distinct from the load set-points, for the power generation devices based on the optimal solution for the objective function; and using the determined load set-points to control the operation of the power generating units of the power generation devices and using the pollution control set-points to control the operation of the pollution control devices of the power generation devices.

2. A method of claim 1, wherein the objective function, subject to the plurality of operating constraints, is solved using a non-linear optimization routine.

3. A method of claim 1, wherein the objective function is solved using an iterative process and wherein a candidate solution for the objective function is selected within the plurality of operating constraints and values, of the plurality of variables, are iteratively changed until an optimal solution is obtained.

4. A method of claim 1, wherein a set of values, for various intermediate load set-points, is selected as a starting point, and optimal values of respective intermediate loads are determined iteratively.

5. A method of claim 1, wherein a set of values of pollution control set-points, of the pollution control devices, is selected as part of a candidate solution for the objective function and optimal values of the pollution levels are determined iteratively.

6. A method of claim 1, wherein an evolutionary algorithm is used to iteratively solve the objective function subject to one or more of the plurality of operating constraints.

7. A method of claim 1, wherein a set of candidate solution points within the plurality of operating constraints is selected, a set of localized solutions corresponding to the set of candidate solution points is obtained using an evolutionary algorithm, and one of the set of localized solutions is selected as the optimal solution of the objective function.

8. A method of operating a power generation system having a plurality of power generation devices, each of the power generation devices including one or more power generating units that produce an amount of energy based on a load set-point, and at least one of the power generation devices including one or more pollution control devices that are controllable independent of the power generation units and that operate at different levels based on pollution control set-points, wherein different values of a pollution control set-point cause a pollution control device to operate at different operating points to affect the amount of emission of pollutants emitted by a power generation device during operation of the power generation device, the method comprising:

receiving, from a workstation, an operating instruction specifying a load demand function and a pollutant emission allowance of the power generation system;

determining, using a processor of a computing device, an objective function of the power generation system, wherein the objective function specifies an operating condition of the power generation system as a function of a plurality of variables including a load set-point and a pollution control set-point of at least one of the plurality of power generation devices;

determining, using the processor of the computing device, an optimal solution of the objective function to generate operating set-points for the plurality of power generation devices that allows the power generation system to meet the load demand function while the total pollutant emissions generated by the power generation system are below the pollutant emission allowance, wherein the optimal solution for the objective function is representative of a cost of operating the power generation system, and wherein the cost of operating the power generation system includes a cost of operating the plurality of power generation devices and a cost of operating the one or more pollution control devices;

determining, using the processor of the computing device, load set-points and pollution control set-points, distinct from the load set-points, for the power generation devices based on the optimal solution of the objective function; and using the determined load set-points to control the operation of the power generating units of the power generation devices and using the pollution control set-points to control the pollution control devices of the power generation devices, wherein the load demand function includes a load ramp, between a beginning time $T_0$ and a ramp time $T_e$, wherein the load demand is $L_0$ at time $T_0$ and $L_e$ at the ramp time $T_e$ $L_e$ $T_e$ $\{T_0,T\}$ $\{t_0,t_1\}$ $\{t_1,t_2\}$ $\{t_{N-1},t_N\}$ $t_0=T_0$ $t_N T$ $T_e$ $L_1, L_2, \ldots, L_N$ $T_0$ $T_e$ $L_k$ $k=1, \ldots, N$ $L_0$ $L_e$ $$L_k = L_0 + k \cdot (L_e - L_0)/(T_e - T_0) t_k \leq T_e$$

$$L_k = L_e t_k > T_e.$$

9. An economic analysis system for optimizing operation of a power generation system having a plurality of power generation devices, each of the power generation devices including one or more power generating units that produce an amount of energy based on a load set-point, and at least one of the power generation devices including one or more pollution control devices that are controllable independent of the power generation units and that operate at different levels based on pollution control set-points, wherein different values of a pollution control set-point cause a pollution control device to operate at different operating points to affect the amount of emission of pollutants emitted by a power generation device during operation of the power generation device, the economic analysis system comprising:

a first module adapted to store an objective function of the power generation system, wherein the objective function provides cost of operating the power generation system as a function of a plurality of variables, the plurality of variables including a load set-point and a pollution control set-point of at least one of the plurality of power generation devices;

a second module adapted to store a plurality of operating constraints of the power generation system;

a third module adapted to obtain an optimal solution for the objective function within the plurality of operating constraints of the power generation system, wherein a load demand function includes a load ramp, and wherein the objective function, subject to the plurality of operating constraints, is solved using a non-linear optimization routine, wherein the optimal solution for the objective function is representative of the cost of operating the power generation system, and wherein the cost of operating the power generation system includes a cost of operating the plurality of power generation devices and a cost of operating the one or more pollution control devices; and a fourth module adapted to determine load set-points and pollution control set-points, distinct from the load set-points, for the power generation devices based on the optimal solution for the objective function, wherein the determined load set-points are adapted to control the operation of the power generating units of the power generation devices and the determined pollution control set-points are adapted to control the operation of the pollution control devices of the power generation devices.

10. A system of claim 9, wherein the pollution control set-point is a desired level of a pollutant generated by the one of the plurality of power generation devices.

11. A system of claim 9, wherein the objective function provides the cost of operating the power generation system further as a function of a pollution credit available to one of the plurality of power generation devices.

12. A system of claim 9, wherein the power generation system is a power grid and the plurality of power generation devices includes a plurality of power plants.

13. A system of claim 9, wherein the third module is further adapted to obtain an optimal solution for the objective function using an evolutionary solution method.

14. A power generation system, comprising:
a plurality of power generation devices, each of the power generation devices including one or more power generating units that produce an amount of energy based on a load set-point, and at least one of the power generation devices including one or more pollution control devices that are controllable independent of the power generation units and that operate at different levels based on pollution control set-points, wherein different values of a pollution control set-point cause a pollution control device to operate at different operating points to affect the amount of emission of pollutants emitted by a power generation device during operation of the power generation device;

a first module adapted to obtain, using a processor of a computing device, a load demand for the plurality of power generation devices;

a second module adapted to obtain, using the processor of the computing device, a pollutant emission allowance for the plurality of power generation devices;

a third module adapted to obtain, using the processor of the computing device, an objective function of the power generation system, wherein the objective function provides cost of operating the power generation system as a function of a plurality of variables, the plurality of variables including a load set-point and a pollution control set-point of at least one of the plurality of power generation devices;

a fourth module adapted to obtain, using the processor of the computing device, a plurality of operating constraints of the power generation system;

a fifth module adapted to obtain, using the processor of the computing device, an optimal solution for the objective function so that when the power generation devices are operated as per the optimal solution the plurality of power generation devices satisfies the load demand and the total pollutant emission output of the plurality of generation devices is less than the pollutant emission allowance, wherein the optimal solution for the objective function is representative of the cost of operating the power generation system, and wherein the cost of operating the power generation system includes a cost of operating the plurality of power generation devices and a cost of operating the one or more pollution control devices; and a sixth module adapted to determine, using the processor of the computing device, load set-points and pollution control set-points, distinct from the load set-points, for the power generation devices based on the optimal solution for the objective function, wherein the determined load set-points are adapted to control the operation of the power generating units of the power generation devices and the determined pollution control set-points are adapted to control the operation of the pollution control devices of the power generation devices $L_e$ $T_e$ $\{T_0,T\}$ $\{t_0,t_1\}$ $\{t_1,t_2\}$ $\{t_{N-1},t_N\}$ $t_0=T_0$ $t_N=T$ $T_e$ $L_1, L_2, \ldots, L_N$ $T_0$ $T_e$ $L_k$ $k=1, \ldots, N$ $L_0$ $L_e$ $$L_k = L_0 + k \cdot (L_e - L_0)/(T_e - T_0) t_k \leq T_e$$

$$L_k = L_e t_k > T_e.$$

15. A system of claim 14, wherein the load demand function includes a load ramp, and wherein the objective function, subject to the plurality of operating constraints, is solved using a non-linear optimization routine.

16. A system of claim 15, wherein the load demand function includes a load ramp, wherein the objective function is solved using an iterative process, and wherein a candidate solution for the objective function is selected within the plurality of operating constraints and values, of the plurality of variables, are iteratively changed until an optimal solution is obtained.

17. A method of claim 8, wherein the load ramp, between times $T_0$ and $T_e$, is a linear ramp, and wherein intermediate target loads $L_k$ (k=1, \ldots, N) are computed, respectively, as a linear interpolation between the initial load $L_0$ and the final load $L_e$ is:

$$L_k = L_0 + k \cdot (L_e - L_0)/(T_e - T_0) \text{ (for } t_k \leq T_e\text{)) and}$$

$$L_k = L_e \text{ (for } t_k > T_e\text{)}.$$

18. A method of claim 17, wherein fuel consumption cost associated with an $i^{th}$ power generation unit, wherein i=1 to n, at a time $t_k$ is:

$$F_i^k = L_i^k \cdot H_i^k \cdot f_i$$

wherein: $L_i^k$=load for the $i^{th}$ unit at time $t_k$;
$H_i^k$=heat rate for the $i^{th}$ unit at time $t_k$; and
$f_i$=fuel price for the $i^{th}$ unit.

19. A method of claim 18, wherein cost of pollution control at time $t_k$ is:

$$R_i^k = \sum_{j=1}^{m} \{S_{i,j}^k \cdot p_{i,j}\}$$

wherein: $S_{i,j}^k$=$j^{th}$ reagent flow for the $i^{th}$ unit at time $t_k$;
$p_{i,j}$=$j^{th}$ reagent price for the $i^{th}$ unit; and
m=total number of pollutant types being controlled.

20. A method of claim 19, wherein total emission credits available for the $j^{th}$ pollutant at time $t_k$ are:

$$C_j^k = \left(X_j^k - \sum_{i=1}^{n} Z_{i,j}^k\right) \cdot c_j$$

wherein: $X_j^k$=total regulation limit for the $j^{th}$ pollutant at time $t_k$;
$Z_{i,j}^k$=$j^{th}$ pollutant produced by the $i^{th}$ unit at time $t_k$; and
$c_j$=credit (or bonus price) for the $j^{th}$ pollutant.

21. A method of claim 20, wherein a total cost $J_k$ of providing load $L_k$ is:

$$J_k = \sum_{i=1}^{n} F_i^k + \sum_{i=1}^{n} R_i^k - \sum_{j=1}^{m} C_j^k.$$

22. A method of claim 21, wherein the total cost $J_k$ further includes at least one of: a cost of transmitting power, a cost of fuel storage, or a time value of money.

23. A method of claim 22, wherein an aggregate cost J of providing load during the time interval $\{T_0, T\}$, is:

$$J = \sum_{k=1}^{N} J_k.$$

24. A method of claim 8, wherein load constraints are:

$$\sum_{i=1}^{n} L_{i,k} = L_k$$

$$L_{i,min} \leq L_{i,k} \leq L_{i,max}$$

$L_{i,min} \leq L_{i,k} \leq L_{i,max}$ wherein: $L_{i,k}$ is a load demand for the $i^{th}$ power generation device at time $t_k$, and $L_{i,min}$ and $L_{i,max}$ are minimum load and the maximum load, respectively, for an $i^{th}$ power generation device.

25. A method of claim 8, wherein a maximum unit ramp constraint is:

$$-M_i \leq L_{i,k+1} - L_{i,k} \leq M_i$$

wherein: $M_i$ is a maximum ramp rate for the power generation devices during any time interval $\{t_{k-1}, t_k\}$.

26. A method of claim 23, wherein a total emission constraint is:

$$\sum_{i=1}^{n} Z_{i,j}^k \leq X_j^k$$

$$Z_{i,j}^k \leq X_{i,j}$$

wherein: for the $j^{th}$ pollutant, a maximum allowable pollution that can be produced by an $i^{th}$ power generation device is $X_{i,j}$, and a total emission of $j^{th}$ pollutant for the $k^{th}$ time period is given by $X_j^k$.

27. A system of claim 14, wherein the load demand function includes a load ramp.

28. A method of claim 8, wherein the load demand function includes a load ramp, between a beginning time $T_0$ and a ramp time $T_e$, wherein the load demand is $L_0$ at time $T_0$ and $L_e$ at the ramp time $T_e$, wherein the load demand is constant at $L_e$ from the ramp time $T_e$ to an ending time T, wherein an overall time period $\{T_0, T\}$ is divided into N time segments ($\{t_0, t_1\}, \{t_1, t_2\} \ldots \{T_{N-1}, t_N\}$) with $t_0=T_0$, $t_N=T$, and T is greater than or equal to $T_e$, and wherein a load demand at the end of each of the time segments is denoted by $L_1, L_2, \ldots, L_N$.

* * * * *